United States Patent [19]
Yamaguchi

[11] Patent Number: 5,345,396
[45] Date of Patent: Sep. 6, 1994

[54] PROTOCOL MACHINE WITH PORTIONS OF THE PROTOCOL HANDLING FUNCTIONS BEING INCORPORATED INTO AN APPLICATION PROGRAM

[75] Inventor: Masahiro Yamaguchi, Tokyo, Japan

[73] Assignee: NEC Corporation, Tokyo, Japan

[21] Appl. No.: 999,531

[22] Filed: Dec. 10, 1992

Related U.S. Application Data

[63] Continuation of Ser. No. 479,468, Feb. 13, 1990, abandoned.

[30] Foreign Application Priority Data

Feb. 13, 1989 [JP] Japan .................... 1-33449

[51] Int. Cl.$^5$ .................... G06F 5/00; G06F 13/00
[52] U.S. Cl. .................... 395/500; 395/200; 395/700; 364/DIG. 1; 364/240.8; 364/260; 364/284.4
[58] Field of Search .............. 364/DIG. 1, DIG. 2; 395/200, 500, 700

[56] References Cited

U.S. PATENT DOCUMENTS

| | | | |
|---|---|---|---|
| 4,281,315 | 7/1981 | Bauer et al. | 340/825.08 |
| 4,509,851 | 4/1985 | Ippolito et al. | 395/200 |
| 4,688,170 | 8/1987 | Waite et al. | 395/500 |
| 4,768,150 | 8/1988 | Chang et al. | 395/700 |
| 4,901,223 | 2/1990 | Rhyne | 395/650 |
| 4,914,619 | 4/1990 | Harris et al. | 395/200 |
| 4,951,245 | 8/1990 | Bailey et al. | 395/275 |
| 5,142,622 | 8/1992 | Owens | 395/700 |

*Primary Examiner*—Paul V. Kulik
*Assistant Examiner*—John C. Loomis
*Attorney, Agent, or Firm*—Foley & Lardner

[57] ABSTRACT

A protocol program contained in a first computer to efficiently transmit and receive data from a second computer. The protocol program has components operating separate from the first computers application program to avoid bottlenecking of unnecessary reception and transmission requests. The protocol program contains a transmission processing program for processing data transmission requests as part of the first computers application program, but a transmission notifying and communication means which deal with the second computer which are separate from the application program. The protocol program also contains a data reception notifying program as part of the first computers application program, but again the communication means and a reception judging means are separate from the application program.

3 Claims, 6 Drawing Sheets

A PREFERRED EMBODIMENT OF THE INVENTION

PROTOCOL MACHINE WITH PORTIONS OF THE PROTOCOL HANDLING FUNCTIONS BEING INCORPORATED INTO AN APPLICATION PROGRAM

This application is a continuation of application Ser. No. 07/479,468, filed Feb. 13, 1990, now abandoned.

BACKGROUND OF THE INVENTION

The present invention relates to a protocol machine for use in processing communication between a plurality of information processing apparatuses linked by a communication line or lines.

An information processing apparatus having such a protocol machine is usually linked to another information processing apparatus by at least one communication line. Such information processing apparatuses have a protocol machine, application programs and communication means which process communication with other information processing apparatuses. The protocol machine may be realized by several programs. Such programs have a structure in which the application program as the user of the protocol machine and the communication means to be used by the protocol machine are independent of each other. In such a system, communication between the application program and an application program in another information processing apparatus is accomplished in the following manner.

The procedure of data transmission is as follows.

The protocol machine is requested by the application program to transmit data to another information processing apparatus. Signals given to the protocol machine and the actions to be taken by the protocol machine in response to the respective signals are prescribed in a state transition table prepared in accordance with the protocol. In response to a data transmission request from the application program, the protocol machine executes transmission processing as provided for in the state transition table. Thus the protocol machine, when there arises a need to transmit data to another information processing apparatus, prepares protocol-prescribed control data on the basis of data supplied from the application program and notifies the communication means of the occurrence of a transmission event. In response to this notification of the transmission event occurrence, the communication means transmits the data prepared by the protocol machine to the information processing apparatus via a communication line.

The procedure of data reception is as follows.

The protocol machine is requested by the application program to receive data. The protocol machine supplies the application program with any data which has been received by the protocol machine from the transmitting information processing apparatus but not yet handed over to the application program.

In the absence of any data, the application program will take on a status of stand-by until the occurrence of a reception event. After stand-by, in response to data from the transmitting information processing apparatus, the communication means instructs the protocol machine to receive the data. Responding to this instruction to receive data, the protocol machine analyzes the data which it received from the communication means according to the protocol, and judges whether or not the data has been generated to be handed over to the application program. The protocol machine, if it judges data has been generated to be handed over, notifies the application program of the occurrence of a reception event. In response to this notification of the reception event occurrence, the application program is released from the stand-by state, and the data are handed over by the protocol machine to the application program.

If a plurality of application programs are to be simultaneously operated within an information processing apparatus, the protocol machine is shared by those plurality of application programs.

Such a protocol machine has the following disadvantages since the protocol machine has several programs with a structure independent of application programs which are the users of the protocol machine and communication means, which are used by the protocol machine.

First is the disadvantage of protocol processing inefficiency because of frequent instructions and reception events. Thus, when an application program requests data transmission, an event instruction must be sent from the application program to the protocol machine. Similarly when the protocol machine requests data transmission from the communication means, an instruction must be sent from the protocol machine to the communication means. When the communication means issues an instruction to receive data, the communication means sends an instruction to notify the protocol machine to receive data. Similarly when the protocol machine requests data reception, it notifies an application program of a reception event.

The instruction or reception event between programs generally reduces the efficiency of protocol processing. A long processing time is required in the information processing apparatus.

Processing time is especially reduced when a large quantity of data is to be transferred at high speed as in the case of a file transfer. To make data transfer more efficient it is possible to accumulate the data from an application program in the protocol machine and subsequently transmit the data collectively to the receiving information processing apparatus via the communication means. With collective transmission, transmission events from the protocol machine to the communication means do not occur so frequently. Without collection transmission a data transmission request from the application program to the protocol machine occurs every time data are handed over from the application program to the protocol machine, resulting in a significant deterioration of efficiency.

Second disadvantage is as follows.

When a plurality of application programs are to be operated in an information processing apparatus, there arise reception events from more than one application program to one protocol machine. As a result, the protocol machine poses a bottleneck to processing by the information processing apparatus, resulting in a deterioration in the performance of the information processing apparatus.

SUMMARY OF THE INVENTION

An object of the present invention is to provide a protocol machine cleared of the above disadvantages and capable of improving the performance of the information processing apparatus of which it is a part.

According to one aspect of the invention, there is provided a protocol machine in an information processing apparatus having communication means for processing data transmission to and reception from another information processing apparatus linked by at least one communication line and at least one application program for processing transactions with said other information processing apparatus, comprising: a protocol machine transmission processing section, built into said application program, for performing operations pertaining to the processing of data transmission in compliance with a data transmission request from said application program as prescribed by said protocol; transmission event notifying means for notifying said communication means, when a need arises in the protocol machine transmission processing section to transmit data to the communicating information processing apparatus, of that event; a protocol machine receiving instruction judging section, built into said communication means, for performing operations pertaining to receiving instruction judgment processing in compliance with a data receiving instruction from said communication means as prescribed by said protocol; reception event notifying means for notifying said application program, when the protocol machine receiving instruction judging section judges that data to be handed over to said application program have been generated, of that event; and a protocol machine reception processing section, built into said application program, for handing over data received from said communicating information processing apparatus to said application program in compliance with a data reception request from said application program.

OPERATIONS

In compliance with a data transmission request from the application program, the protocol machine transmission processing section built into the application program performs an operation pertaining to the data transmission request as prescribed by the protocol; if this operation necessitates the transmission of data to another information processing apparatus, the protocol machine actuates the transmission event notifying means. The protocol machine then notifies the communication means of the occurrence of the event to transmit data, and the communication means transmits the data. On the other hand, in compliance with a data receiving instruction from the communication means, the protocol machine receiving instruction judging section built into the communication means performs an operation pertaining to receiving instruction judgment processing as prescribed by said protocol. If the receiving instruction operation is judged to have generated data to be handed over to the application program, the protocol machine receiving instruction judging section actuates the reception event notifying means. The reception event notifying means then notifies the application program of the occurrence of the event. In compliance with this data reception request from the application program, the protocol machine reception processing section built into the application program hands over said received data to the application program.

BRIEF DESCRIPTION OF THE DRAWINGS

Other features, operations and advantages of the present invention will become more apparent from the following detailed description when taken in conjunction with the accompanying drawings, in which.

In the figures, the same reference numerals denote respectively the same constituent elements.

DETAILED DESCRIPTION OF THE PREFERRED EMBODIMENTS

Figure 1:
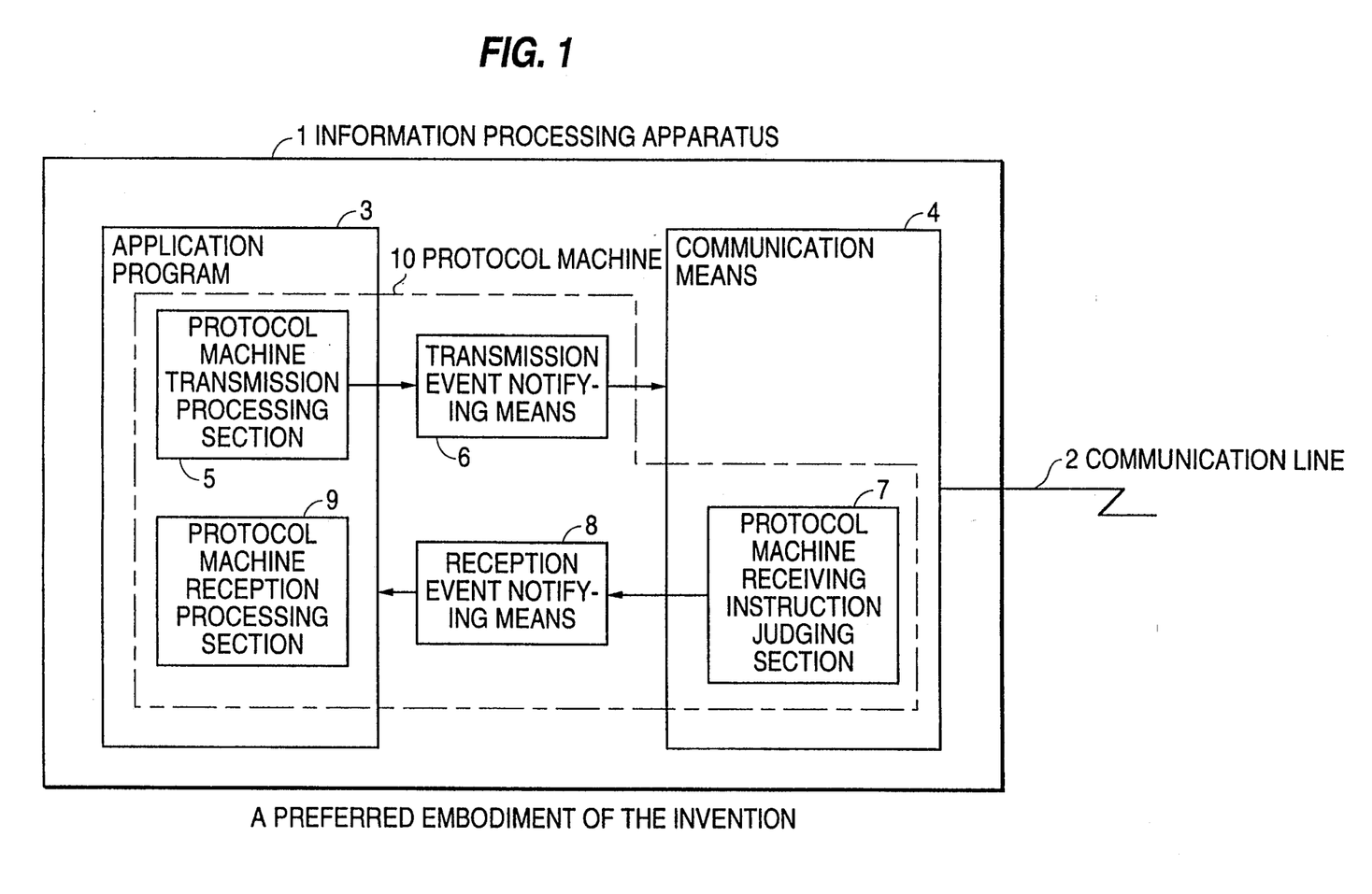
FIG. 1 illustrates a configuration involving a preferred embodiment of the invention.

Referring to FIG. 1, a system to which a preferred embodiment of the present invention is applicable is provided with an information processing apparatus 1, another information processing apparatus not shown, and a communication line 2 linking these information processing apparatuses.

A protocol machine 10, which is the preferred embodiment of the invention, is arranged within the information processing apparatus 1, and partly included in an application program 3 for processing transactions with another information processing apparatus by utilizing the functions offered by the protocol machine 10 and in communication means 4 for processing data transmission to and reception from the other information processing apparatus via the communication line 2. Thus, the preferred embodiment of the present invention includes a protocol machine transmission processing section 5 responsive to the actuation of the application program 3 for performing transmission processing based on the protocol; transmission event notifying means 6 responsive to the actuation by the processing section 5 for notifying the communication means 4, when a need arises to transmit data to the protocol machine in the other information processing apparatus (hereinafter called the other protocol machine), of that transmission event; a protocol machine receiving instruction judging section 7 for interpreting control data from the other protocol machine according to the protocol and judging whether or not data to be handed over to the application program 3 have been generated; reception event notifying means 8 responsive to the actuation by the protocol machine receiving instruction judging section 7 as to the generation of data to be handed over to the application program 3 for notifying the application program 3 of the occurrence of a transmission event and of the received data; and a protocol machine reception processing section 9 responsive to the actuation of the application program 3 for processing the data received from the communication means 4 in accordance with the protocol.

Next will be described in detail the internal configurations of these constituent elements with reference to the corresponding drawings. Referring first to FIG. 1, the protocol machine transmission processing section 5 is realized as a subroutine of the application program 3. As a result, the exchange of information is made possible without the instruction or receipt of an event between the protocol machine transmission processing section 5 and the application program 3.

Figure 2:
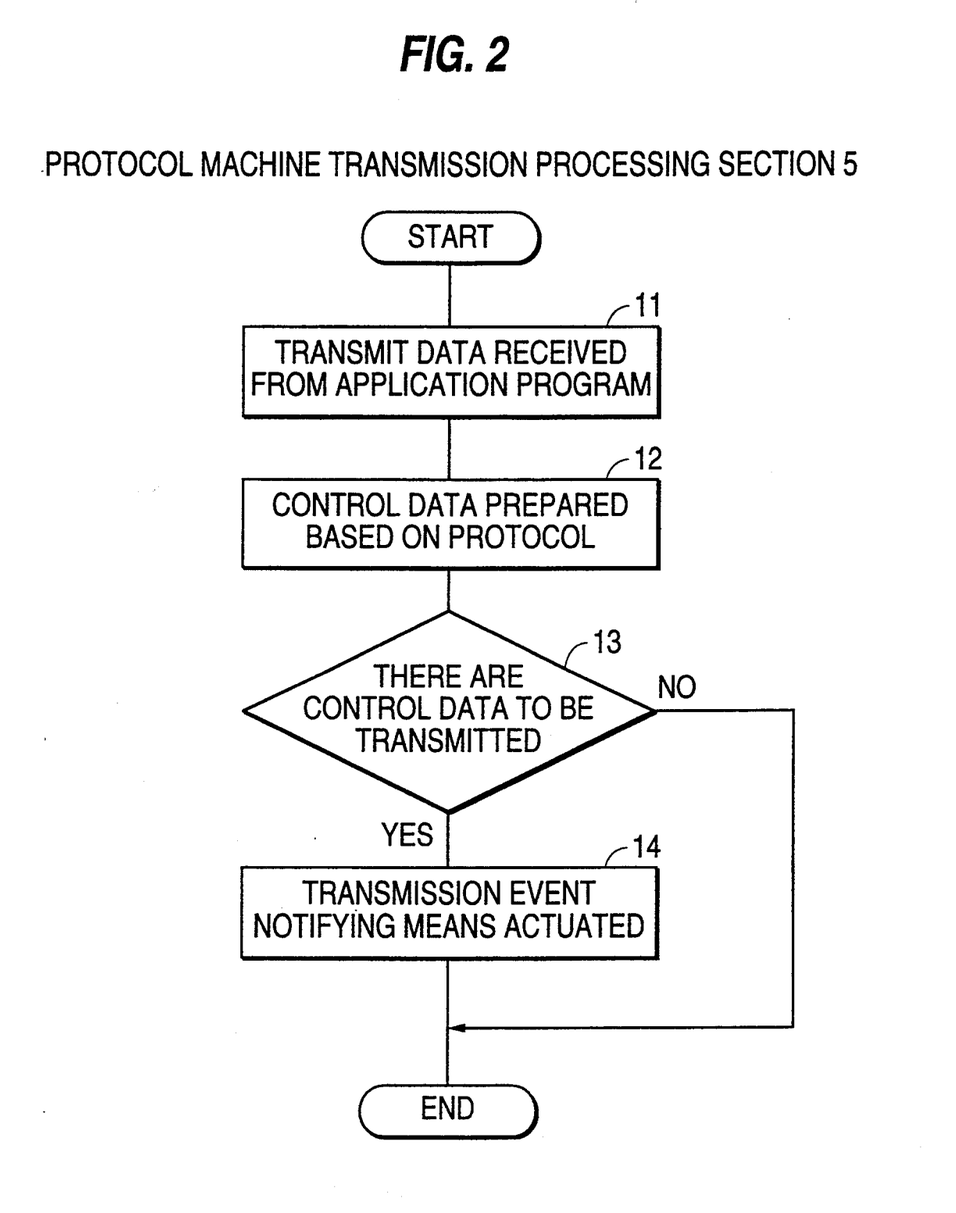
FIG. 2 illustrates the configuration of the protocol machine transmission processing section 5 in the embodiment of FIG. 1.

Referring to FIGS. 1 and 2 together, the protocol machine transmission processing section 5 first receives transmit data from the application program 3 (Step 11), and prepares control data in accordance with the protocol (Step 12). These control data are intended for transmission to the other protocol machine.

Next is judged whether or not there are control data to be transmitted to the other protocol machine (Step 13). If it is judged that there are control data to be transmitted, the transmission event notifying means 6 is actuated (Step 14). If it is judged there are not, processing by the protocol machine transmission processing section 5 is completed. The processings taking place in this processing section 5 also include the transmission processing for the control data, that for the data received from the application program 3 and temporary storage processing in order to accumulate the data from an application program.

Figure 3:
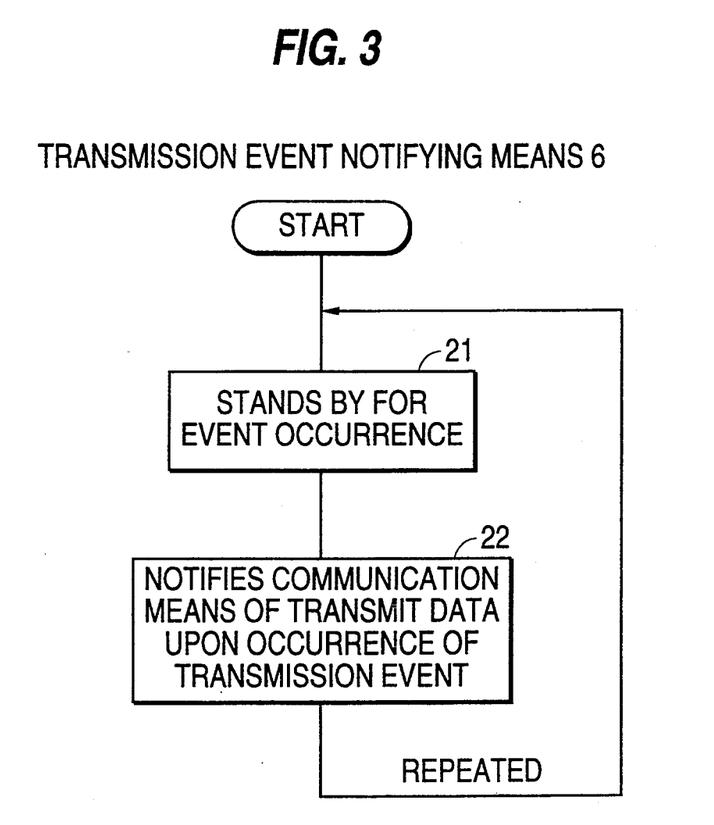
FIG. 3 illustrates the configuration of the transmission event notifying means 6 in the embodiment of FIG. 1.

Referring now to FIGS. 1 and 3 together, the transmission event notifying means 6 first stands by for the occurrence of an event (Step 21). Then, in response to the occurrence of a transmission event, the transmission event notifying means 6 notifies the communication means 4 of the control data as data to be transmitted (Step 22). Thereafter, the steps 21 and 22 are repeated.

Figure 4:
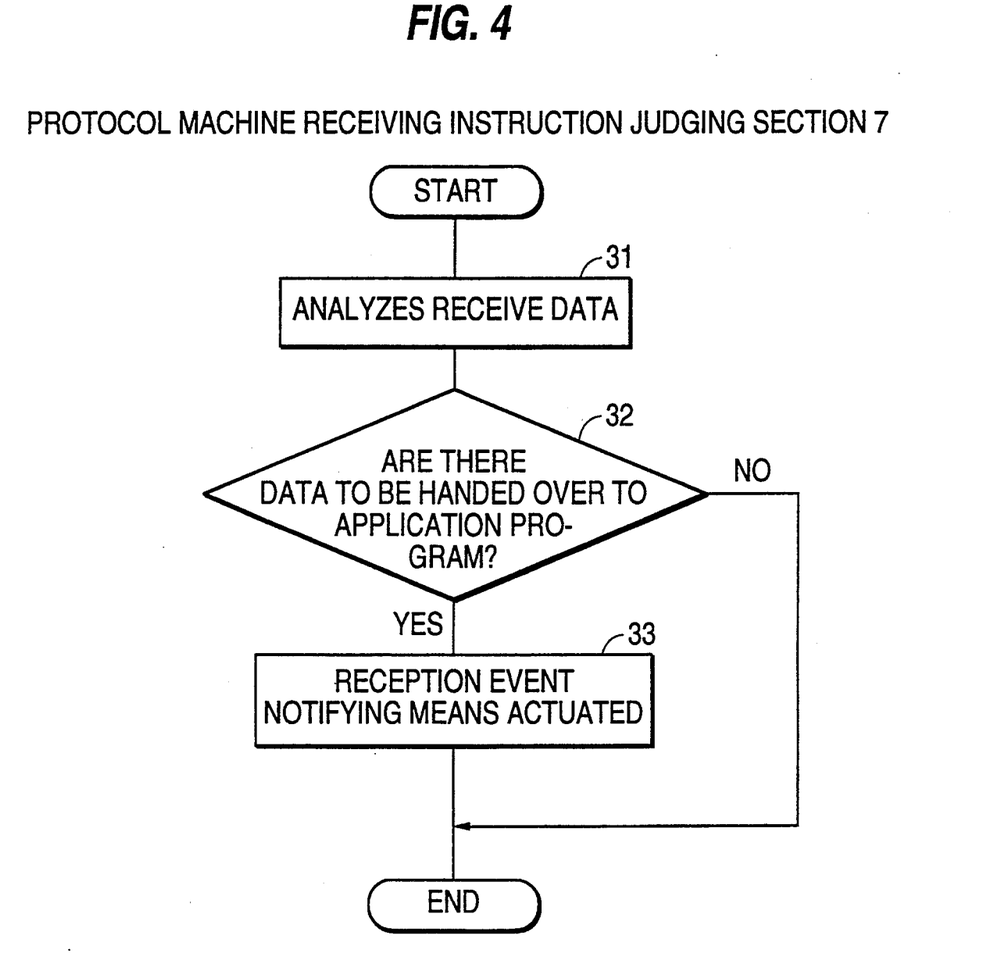
FIG. 4 illustrates the configuration of the protocol machine receiving instruction judging section 7 in the embodiment of FIG. 1.

Referring to FIGS. 1 and 4, the protocol machine receiving instruction judging section 7 analyzes, in compliance with a data receiving instruction from the communication means 4, the control data sent from the other protocol machine via the communication line 2 in accordance with a rule prescribed by the protocol (Step 31). This analysis judges whether or not data to be handed over to the application program 3 have been generated (Step 32). If it is judged at this Step 32 that data to be handed over have been generated, the reception event notifying means 8 is actuated (Step 33). The protocol machine receiving instruction judging section 7, structured as a subroutine of a program to realize the communication means 4, makes possible the exchange of information without the instruction or receipt of an event between the judging section 7 and the communication means 4.

Figure 5:
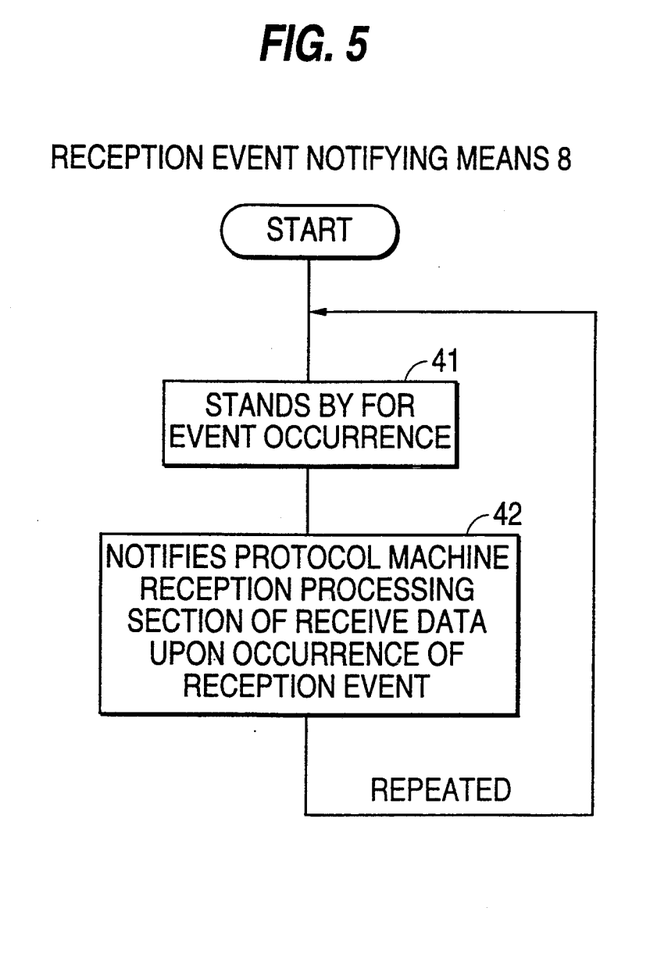
FIG. 5 illustrates the reception event notifying means 8 in the embodiment of FIG. 1.

Referring now to FIGS. 1 and 5, the reception event notifying means 8 stands by for the occurrence of the event of the generation of data to be handed over to the application program 3 (Step 41). In response to the occurrence of this event, the reception event notifying means 8 notifies the protocol machine reception processing section 9 of the data to be received (Step 42). Thereafter, these Steps 41 and 42 are repeated.

Figure 6:
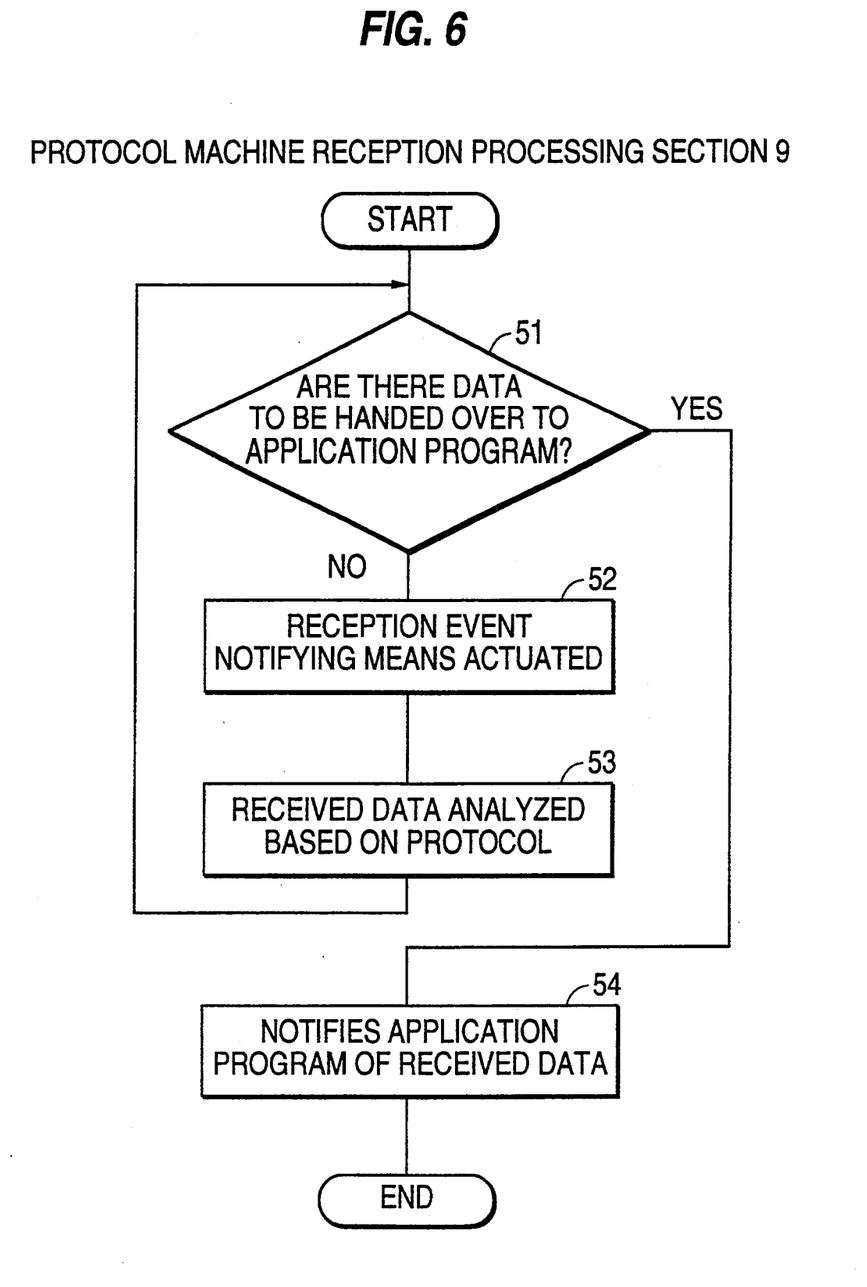
FIG. 6 illustrates the protocol machine reception processing section 9 in the embodiment of FIG. 1.

Referring to FIGS. 1 and 6, the protocol machine reception processing section 9, structured as a subroutine of the application program 3, makes possible the exchange of information without the instruction or receipt of an event between the processing section 9 and the application program 3.

The processing section 9, actuated by the application program 3, judges whether or not there are data to be handed over to the application program 3 (Step 51). In response to a judgment at this Step 51 that there are no data to be handed over to the application program 3, the reception event notifying means 8 is actuated (Step 52), stands by for the occurrence of the event from the reception event notifying means 8 and analyzes the receive data in accordance with the protocol (Step 53). On the basis of the result of this analysis, it is judged whether or not there are data to be handed over to the application program 3 (Step 51). In response to a judgment at this Step 51 that there are data to be handed over, the protocol machine reception processing section 9 notifies the application program 3 of the receive data.

Next will be described the operations of the preferred embodiment of the present invention structured as described above.

First will be described the operation which takes place when the application program 3 in the information processing apparatus 1 transmits data.

Referring to FIGS. 1 through 6 together, in response to a request to transmit data from the application program 3 in the information processing apparatus 1, the protocol machine transmission processing section 5 built into the program is actuated.

The protocol machine transmission processing section 5 judges, in accordance with data handed over from the application program 3 and the predetermined protocol, whether or not data should be transmitted to the other information processing apparatuses. If no data needs to be transmitted to the other information processing apparatuses, the data handed over from the application program 3 are temporarily stored in the protocol machine transmission processing section 5. On the other hand, if data do need to be transmitted to the other information processing apparatuses, protocol-prescribed control data are prepared on the basis of the data handed over from the application program 3, and the transmission event notifying means 6 is caused to notify the communication means 4 of the occurrence of the transmission event. The communication means 4, upon receipt of the notification of the occurrence of the transmission event from the protocol machine transmission processing section 5 via the transmission event notifying means 6, transmits the data prepared by the protocol machine transmission processing section 5 to the other information processing apparatuses via the communication line 2.

Next will be described the operation which takes place when the application program 3 in the information processing apparatus 1 receives data.

As the application program 3 in the information processing apparatus 1 requests reception of data, the protocol machine reception processing section 9 built into the program is actuated. Upon actuation, the protocol machine reception processing section 9 judges whether or not there are data received from the application program in the other information processing apparatus but not yet handed over the application program 3. If the judgment is in the affirmative, the data are handed over to the application program 3. On the other hand, in the absence of such data, the application program 3 is caused to stand by for a reception event.

After that, as the communication means 4 receives data transmitted from the other information processing apparatus and gives a data receiving instruction, the protocol machine receiving instruction judging section 7 is actuated. In response to the actuation of the protocol machine receiving instruction judging section 7, it is judged whether or not there have been generated data which were originally handed over from the communication means 4 and are to be analyzed in accordance with the predetermined protocol and handed over to the program 3. In response to an affirmative judgment, the reception event notifying means 8 notifies the application program 3 of the occurrence of a reception event. In response to a negative judgment, the application program 3 is notified of no occurrence of a reception event. Upon receipt of the notification of the occurrence of a reception event from the protocol machine receiving instruction judging section 7 via the reception event notifying means 8, the application program 3 is released from the standing-by state, and actuates the protocol machine reception processing section 9 to receive the data to be received.

The repetition of these operations enables data transmission and reception to take place between the application program 3 and a second application program in another information processing apparatus.

The configuration of the protocol machine according to the present invention in which the protocol machine is partially built into the application program and the communication means as hitherto described has resulted in the following benefits.

(1) No event is processed in the following cases;
  The application program requests data transmission but the protocol machine does not need to transmit data over the communication means,
  The application program requests data reception but the protocol machine does not need to receive data from the communication means.

Therefore, overall frequency of event processing occurrences is reduced to make possible faster protocol processing.

The benefit of elimination of event processing is especially remarkable when a large quantity of data is transferred at high speed as in the case of a file transfer. When a file is transferred in the present invention, data handed over from the application program are accumulated in the protocol machine for eventual collective transmission to the other information processing apparatus via the communication means. Unlike in the prior art, an event is not transmitted or received every time data are handed over from the application program, so little event time is needed to transmit or receive.

(2) Even when a plurality of application programs are to be simultaneously operated within one information processing apparatus, events are not sent to a single protocol machine from more than one application program unlike in the prior art, because a protocol machine is built into each application program. Therefore, the protocol machine would pose no bottleneck to processing by the information processing apparatus, and performance is improved at the time of the simultaneous operation of plural application programs.

What is claimed is:

1. A protocol machine in an information processing apparatus having a communication section for processing data transmission to and reception from another information processing apparatus linked by at least one communication line and at least one application program executed by said information processing apparatus for processing transactions with said another information processing apparatus comprising:

a protocol machine transmission processing section implemented by said information processing apparatus, which is implemented by execution of said application program, said protocol machine transmission processing section including means for receiving data to be transmitted, means for judging based on a predetermined protocol and said data, whether said data should be transmitted to said another information processing apparatus, means for converting, based on a judgment to transmit, said data to be transmitted into control data based on said predetermined protocol, and means for outputting an actuating signal when said control data is ready to be transmitted to said another information processing apparatus;

transmission event notifying section receiving said actuating signal and notifying said communication section, when a need arises in the protocol machine transmission processing section to transmit data to said another information processing apparatus;

a protocol machine receiving instruction judging section, which is part of said communication section receiving other control data from said another information processing apparatus, analyzing said other control data in accordance with said predetermined protocol and determining whether there are data to be supplied to said application program;

reception event notifying section notifying said application program, when the protocol machine receiving instruction judging section judges that data to be supplied to said application program has been generated; and a protocol machine reception processing section implemented by said information processing apparatus, built into said application program, for supplying data received from said another information processing apparatus to said application program in compliance with a data reception request from said application program.

2. An apparatus in a first computer comprising:

an application program executing on said first computer;

a transmission processing program implemented by said first computer for judging based on data and a predetermined protocol, whether said data should be transmitted to a second computer, and upon judging that data should be transmitted processing data transmission transactions based on said predetermined protocol when a data transmission request is received from said application program;

a transmission notifying section receiving transmission processing program requests from said transmission processing program and notifying a communication section of said transmission processing program request to transmit said data transmission transactions to said second computer;

said communication section receiving notification from said transmission notifying section, transmitting said data transmission transactions to said second computer and receiving data reception transactions from said second computer;

an instruction reception judging section receiving said data reception transactions from said communication section analyzing said data reception transactions in accordance with a protocol, and determining whether there are said data reception transactions to be supplied to said application program;

a reception notifying section coupled to said instruction reception judging section for notifying a reception processing program when said instruction reception judging section receives said data reception transactions; and said reception processing program implemented by said first computer receiving notification from said reception notifying section and sending said data reception transactions to said application program if said reception notifying section gives notice that said data reception transactions are received and a data reception request is received from said application program, wherein said transmission processing program is part of said application program and wherein said instruction reception judging section is part of said communication section.

3. An apparatus in a first computer as claimed in claim 2, wherein said reception processing program is implemented by execution of said application program.

* * * * *